US008754166B2

(12) United States Patent
Lewin et al.

(10) Patent No.: US 8,754,166 B2
(45) Date of Patent: Jun. 17, 2014

(54) COATINGS SYSTEM WITH COMMON ACTIVATOR AND COMMON VOLUMETRIC MIX RATIO

(75) Inventors: Laura Ann Lewin, Greenville, DE (US); Denise Elizabeth Fiori, Trumbull, CT (US); Carl L. Kishbaugh, Townsend, DE (US); Brian Edward Priore, Mount Royal, NJ (US); Audrey Pamela Stephenson, Philadelphia, PA (US)

(73) Assignee: Axalta Coating Systems IP Co., LLC, Wilmington, DE (US)

( * ) Notice: Subject to any disclaimer, the term of this patent is extended or adjusted under 35 U.S.C. 154(b) by 679 days.

(21) Appl. No.: 11/518,783

(22) Filed: Sep. 11, 2006

(65) Prior Publication Data

US 2007/0212480 A1 Sep. 13, 2007

Related U.S. Application Data

(60) Provisional application No. 60/716,788, filed on Sep. 12, 2005.

(51) Int. Cl.
| | |
|---|---|
| *C08G 18/08* | (2006.01) |
| *C08L 75/00* | (2006.01) |
| *C08G 18/28* | (2006.01) |
| *B05D 3/00* | (2006.01) |
| *B32B 43/00* | (2006.01) |
| *B05D 3/02* | (2006.01) |
| *B05D 1/36* | (2006.01) |
| *B05D 7/00* | (2006.01) |

(52) U.S. Cl.
USPC ........... 524/589; 524/590; 525/153; 525/452; 427/140; 427/372.2; 427/407.1

(58) Field of Classification Search
USPC ........... 524/589, 590; 525/452, 123; 427/140, 427/407.1, 372.2
See application file for complete search history.

(56) References Cited

U.S. PATENT DOCUMENTS

| | | | | |
|---|---|---|---|---|
| 5,851,583 | A * | 12/1998 | Kronenwetter | 427/140 |
| 6,277,497 | B1 | 8/2001 | Aerts et al. | |
| 6,313,218 | B1 * | 11/2001 | Fiori et al. | 524/801 |
| 6,316,543 | B1 * | 11/2001 | Fiori | 524/801 |
| 6,316,564 | B1 * | 11/2001 | Huybrechts et al. | 526/261 |
| 6,333,077 | B1 * | 12/2001 | Maag et al. | 427/496 |
| 6,559,327 | B2 | 5/2003 | Gridnev et al. | |
| 6,642,311 | B2 | 11/2003 | Barsotti et al. | |
| 6,677,045 | B1 * | 1/2004 | Meisenburg et al. | 428/424.2 |
| 6,765,056 | B2 * | 7/2004 | Hobel et al. | 524/591 |
| 6,835,420 | B1 * | 12/2004 | Rockrath et al. | 427/407.1 |
| 6,902,820 | B2 | 6/2005 | Huybrechts et al. | |
| 2002/0122887 | A1 * | 9/2002 | Forbes et al. | 427/372.2 |
| 2003/0031804 | A1 * | 2/2003 | Rekowski et al. | 427/557 |
| 2003/0054118 | A1 * | 3/2003 | Rekowski et al. | 427/557 |
| 2005/0054786 | A1 * | 3/2005 | Barsotti et al. | 525/453 |
| 2005/0074615 | A1 * | 4/2005 | Adelman et al. | 428/411.1 |
| 2005/0079293 | A1 * | 4/2005 | Baumgart et al. | 427/553 |
| 2005/0085614 | A1 * | 4/2005 | Barsotti et al. | 528/44 |
| 2006/0046068 | A1 * | 3/2006 | Barancyk et al. | 428/423.1 |

FOREIGN PATENT DOCUMENTS

| | | | | |
|---|---|---|---|---|
| WO | WO9840170 | * | 9/1998 | B05D 3/06 |
| WO | WO 02/14444 A1 | | 2/2002 | |
| WO | WO 02/43880 A2 | | 6/2002 | |

OTHER PUBLICATIONS

Tom Brownell, "How to Restore Your Chevrolet Pickup" new edition, p. 130, col. 2, 2004, Motor Books International, St. Paul MN.*
PCT International Search Report and Written Opinion for International Application No. PCT/US2006/035415 dated Jan. 8, 2007.

* cited by examiner

*Primary Examiner* — Patrick Ryan
*Assistant Examiner* — Aaron Greso
(74) *Attorney, Agent, or Firm* — Ingrassia Fisher & Lorenz, P.C.

(57) ABSTRACT

A multilayer paint system wherein each layer of paint uses the same activator and the same mixing ratio of film-forming binder to activator. The paint system herein is particularly useful for automotive refinishing applications.

14 Claims, No Drawings

COATINGS SYSTEM WITH COMMON ACTIVATOR AND COMMON VOLUMETRIC MIX RATIO

CROSS-REFERENCE TO RELATED APPLICATION

This application claims priority under 35 U.S.C. §119 from U.S. Provisional Application Ser. No. 60/716,788, filed Sep. 12, 2005.

TECHNICAL FIELD

This invention relates to coating systems that are particularly useful for automotive refinishing applications and more particularly to an automotive refinish paint system that uses a common activator and a common mix ratio for the primer, sealer, single-stage topcoat, and clearcoat layers. The inventive paint system preferably does not incorporate a reducer that is common in a refinish paint shop, thereby further simplifying the refinish painting process.

BACKGROUND OF THE INVENTION

In the automotive paint and refinish market, a number of different paints are manufactured to meet consumer demands and workflow goals. A refinish paint manufacturer will offer many different paint grades (lines) that will produce differing qualities of finishes on a vehicle. The manufacturer will also produce for use within each paint line, primer fillers, sealers, basecoats, single-stage topcoats, and clearcoats that are specifically designed to adhere to and to produce quality finishes with one another. More than one of each of the individual paint layers is typically, produced. For example, two different clearcoats generally may be used; one being a fast-drying clearcoat for use in repairing a small area and another being a slower-drying clearcoat that has very good visual appearance for use over a large portion of the surface being repaired, typically an entire body panel or the entire vehicle.

In general, each of these paint layers will consist of two (2K) or a three-components (3K) which must be mixed in the correct ratio prior to application. A 2K paint mixture consists of a first component which is generally the film-forming binder and other adjuvants. The second component, called the activator or activator package, is the crosslinker and its adjuvants. In refinish paint, the crosslinker is usually a polyisocyanate or a mixture of polyisocyanates. Within this second component, a paint manufacturer will have several activator packages which the application specialist will chose generally based upon the ambient spray conditions. The activator packages that the manufacturer supplies is most often chosen from a low temperature activator package for use when the ambient spray conditions are relatively cool, a medium temperature activator package, and a high temperature activator package for use when the ambient spray temperature is relatively high. Other activator packages may also be provided to further allow for spray condition latitude. While the activator packages have typically been formulated to conform to ambient spray temperatures, the application specialist has a certain amount of freedom in choosing which component to use depending upon the workflow and customer expectations.

In a 3K paint system, the first two components are the same as a 2K but this system adds a third solvent component, also called the reducer. The reducer is added if a mixture of the first two components, called a pot mix, is too viscous for the spray equipment. As with the activator packages, the reducer is chosen with ambient spray temperature in mind. For low temperature spray conditions, a reducer is chosen that is relatively volatile. For relatively high ambient temperature spray conditions, a reducer is chosen that is less volatile. A paint manufacturer may provide several reducer packages for the application specialist to choose from.

While an activator package may be useful for one layer such as the primer layer, different activator packages may have to be developed for each of the individual layers. To help alleviate the problem of different activator packages for each paint layer, some paint manufacturers have developed a series of common activator packages that can be used for more than one of the layers. However, the mixing ratio of the film-forming binder and the activator package in one layer is a different ratio than what is required for the other layers and, no paint system uses only one activator for all of the layers. Complicating this system even more is the fact that one layer may require a reducer while another layer will not use any reducer at all.

The refinish paint application specialist is required to consult multiple sources to make sure the correct mixing ratios are used, the correct activator package is added to the film-forming binder, and the correct reducer along with its corresponding correct amount is added if one is needed. In addition to all of these requirements, the shop owner must be sure that the application specialist has all of the correct components on hand to meet the demands of the job conditions.

The present invention is directed at a simplified paint system that uses a common activator for each of the layers and wherein all of the layers use the same binder to activator mix ratio and preferably, no reducer addition is required to form a sprayable pot mix. The invention allows the refinish paint application specialist to simplify the painting process. Preferably, in countries that use non-metric units, the paint system is formulated to have a binder to activator mix ratio of from about 8:1 to about 1:1, preferably from about 4:1 to about 1:1 and in countries that use metric units, the paint system can be formulated to a binder to activator ratio of from about 5:1 to about 1:1. This will also allow the shop owner to reduce the number of paint cans held in their inventory.

SUMMARY OF THE INVENTION

The present invention provides a refinish paint system which comprises at least two paints, wherein each of the paints includes:

an unactivated film-forming portion; and an activator portion that when combined with said unactivated film-forming portion, forms a coating composition, said coating composition being capable of forming at least one of a primer filler layer, a sealer layer, a topcoat later, or a clearcoat layer, wherein the same activator portion is used to crosslink each of the unactivated film-forming portions and each layer uses the same unactivated film-forming portion to activator volumetric mix ratio. The paint system of this invention does not require a separate reducer addition.

Also disclosed is a refinish paint system that comprises at least two paint layers chosen from a primer filler, a sealer, a basecoat, a single-stage topcoat, and/or a clearcoat paint.

Also included in the present invention is a refinish paint system wherein the unactivated film-forming binder contains resins that have, on average, at least two functional groups per molecule that are crosslinkable with polyisocyanate compounds and wherein the activator package comprises polyisocyanates.

The refinish paint system of the present invention provides for paints that are formulated to meet current VOC standards and have a binder to activator mix ratio in the range of 8:1 to about 1:1.

The present invention further provides a vehicle painted using the above refinish paint system.

DETAILED DESCRIPTION OF THE INVENTION

As used herein:

"Primer filler", "primer surfacer", and "primer" means a paint that is able to fill small irregularities and imperfections to provide a sandable surface that can be over coated with a sealer and/or a colorcoat.

"Sealers" means a paint that helps improve adhesion between the substrate and the colorcoat. Generally, the sealer is not sanded although it can be optionally nib-sanded to remove minor imperfections. One important property of a sealer layer is to have a fast physical dry which allows for early nib-sanding and a quick turn-around time to apply the next layer.

"Substrate" means the surface to be coated. It may include an OEM painted surface, bare metal, a plastic surface, a primer layer, a sealer layer, and the like.

"Basecoat" or "colorcoat" means a layer or layers of pigmented paint, optionally containing metallic or effect pigment flakes, that are most often afterward overcoated with a clearcoat.

"Clearcoat" means a transparent or semi-transparent paint that provides the gloss and distinctness of image (DOI) that is common on vehicles today. The clearcoat also provides protection to the basecoat from scratches and environmental damage such as acid rain.

"Single-stage topcoat" or "topcoat" means a paint that provides the color to a vehicle and also has a finish that is glossy and provides distinctness of image without the need for a separate clearcoat.

"2K paint" means a refinish paint that consists of 2 separate component packages. One component is the film-forming binders along with adjuvants. The film-forming binders are generally oligomeric and/or polymeric species that have functional groups capable of reacting with the reactive functional groups in the second component. The functional groups of the film-forming binders are preferably hydroxyl groups, but may also be chosen from amino, epoxy, thiol, and the like, or mixtures thereof. The adjuvants can include solvents, catalysts, rheology control agents, leveling agents, pigments, fillers, and the like. The second component is the activator or hardener which contains the crosslinking agent and generally comprises polyisocyanates or other crosslinking groups along with other adjuvants, which can include catalysts and solvents, and the like. The polyisocyanates are preferably unblocked. The catalysts and solvents of the activator package can be tailored for varying application conditions. A sprayable paint composition is made by mixing the two components together to form a pot mix and applying to the substrate within a set amount of time according to the manufacturers instructions.

"Pot mix" means a ready to spray activated composition which comprises a mixture of the film-forming binder package, the activator package, and optionally reducer. The present invention preferably does not require the use of a reducer package.

"3K paint" means a refinish paint that consists of three separate component packages. The first two components are the same as in a 2K-paint system. This system adds a third component, sometimes called a reducer that is generally a solvent or a mixture of solvents.

"Binder resins" or "film-forming binders" mean the polymers or oligomer resins that contain crosslinkable functionality. The crosslinking groups, which are preferably hydroxyl groups, react with the isocyanate groups of the activator to form a tough polymer network. Each individual polymer or oligomer chain contains, on average, at least 2 crosslinkable groups per molecule.

"Activator" or "hardener" or "activator package" means a crosslinking agent and generally consists of polyisocyanates or other crosslinking groups along with other adjuvants. The polyisocyanates are unblocked. The adjuvants can include solvents, catalysts, moisture scavengers, and the like. Typical useful isocyanates are hexamethylene diisocyanate and isophorone diisocyanates or derivatives thereof. As used herein, the activator will be assumed to be designed for the ambient spray conditions. Typically, a paint manufacturer will formulate a group of activators that the application specialist will chose depending upon conditions, usually temperature. The paint manufacturer will change various ingredients of the formulation to match spray conditions. The ingredients that can be varied include but are not limited to the type and concentrations of polyisocyanate, catalyst, solvent, and the like.

As used herein, "mix ratio" means volumetric mix ratio and more particularly, means the volumetric ratio of film-forming binders to activator. For example, a 4:1 mix ratio means that if 500 ml of a coating composition is desired, the spray applicator would mix together 400 ml of the film-forming binder composition and 100 ml of the activator composition to form the sprayable pot mix.

Unless otherwise specified, the term "oligomer" or "oligomeric" means a low molecular weight acrylic, polyester, polyether or epoxy polymer that has a weight molecular weight in the range of from about 300 to about 5,000 g/mole and preferably has on average at least two functional groups per molecule that can be reacted with an isocyanate group. Preferably, the functional groups in the oligomer are hydroxyl groups.

In the past, most refinish paint systems have used a specific activator for each of the layers and changed the activator mixing ratio and reducer additions to provide the curing and appearance properties for each of the layers. In the present invention, by modifying the binder resins, the inventors have been able to provide a complete refinish paint system that allows the applicator to use a common activator and a common mix ratio in each of the layers. The ability to use a common activator and common mix ratio allows the refinish shop to reduce the number of paint cans to be held in inventory for completing a refinish paint job.

The strategy to achieve the common activator and common mix ratio across all the layers involved selection of an activator package with a minimum amount of isocyanate.

In order to produce high quality refinish coatings, the stoichiometric range of isocyanate and crosslinkable functionality, typically hydroxyl functionality, must be maintained. Across all layers the typical stoichiometric range of isocyanate to hydroxyl is 0.7 to 2, preferably 0.8 to 1.8, and most preferably of 0.9 to 1.6. To achieve a common activator and a common mix ratio the inventors manipulated the binder resins to lie in the correct stoichiometric range for the chosen activator. In general, overall clearcoats have a high isocyanate demand. Spot and Panel clearcoats have a medium isocyanate demand, and undercoats (primers and sealers) have a low isocyanate demand. To accomplish this, the inventors chose a spot and panel clear which has a median isocyanate demand which minimizes the amount of binder resin manipulation of the other layers to achieve the desired stoichiometric properties. All layers were then chosen to have the isocyanate demand of the spot and panel clearcoat. Therefore, only the primer filler, primer sealer, overall clear, and the single stage required redesigning of the binder to accommodate the invention while maintaining the high quality film properties.

Across all layers the typical stoichiometric range of isocyanate to hydroxyl is 0.7 to 2, preferably 0.8 to 1.8, and most preferably of 0.9 to 1.6. The binder resins of the overall clearcoat, the primer filler and primer sealer were selected and formulated to produce coatings with stoichiometric ranges as defined above.

Primer Layer

Most current primer layers comprise relatively high $T_g$, high molecular weight, polymers that have relatively low level of crosslinkable functionality. The primer layer also contains a large percentage of pigments, which produces a high viscosity pot mix. The viscosity of this mixture is generally too high for typical spray equipment. To form a sprayable pot mix, current primers are three component paints, requiring at least some reducer. The relatively high $T_g$ of the binder resin and the high pigment loading contributes to excellent sanding performance, which is an important attribute for this layer. This allows a reasonably fast dry to allow the refinisher to sand and prepare the surface for overcoating without unduly tying of room in the shop. A commonly used refinish paint system, called URO® 110XS, available from DuPont, Wilmington, Del., uses a 3K primer that has a mix ratio of 4:1:1 (binder resin:activator:reducer).

In order to achieve the targeted stoichiometry, mix ratio and desired properties, an acrylic resin with higher crosslinkable functionality was selected. The binder of the current invention contains 10-30% higher functionality than a typical primer resin. To meet the viscosity requirements of the activated sprayable primer, a lower molecular weight acrylic was required. This primer formulation can tolerate the higher isocyanate content demanded by the activator and is less viscous than current primers. When used with a common activator and mix ratio described in this invention, this primer formulation falls within the desired stoichiometric range as described above.

Sealer Layer

A sealer layer may be applied over a substrate and helps to fill in very small imperfections in the substrate surface. A sealer also promotes adhesion between the substrate and layers coated over top of it. A sealer layer must have good flow and good appearance and is typically not sanded. Typical commercially available sealers will often use the same binder resins and activators as primers but will have a lower pigment to binder ratio which enhances wet spray and flow, resulting in a smooth surface.

The sealer of the present invention, like the primer layer discussed above, employs binder resins that have lower molecular weight but higher functionality. While the acrylic binder resin is similar to that of the primer described above, an oligomeric component is added to the sealer to improve the flow characteristics of this layer. In one embodiment, this is done by combining a hydroxyl functional acrylic polymer with a structured hydroxyl functional polyester oligomer. The lower molecular weight of the polyester oligomer allows the uncured pot mix to flow and fill in any of the small imperfections that may be present in the primer and the higher functionality of the acrylic polymer allows for the stoichiometric requirements as discussed above. When used with a common activator and mix ratio described in this invention, this sealer formulation falls within the desired stoichiometric range as described above.

Various useful oligomeric components are suitable and are described in patents U.S. Pat. Nos. 6,277,497, 6,642,311, and 6,902,820. Other oligomers are suitable as will be apparent to those skilled in the art providing that the oligomer has on average, at least two functional groups per molecule that are capable of reacting with isocyanate functionalities, preferably hydroxyl groups.

Clearcoat Layer

Current refinish paint systems generally utilize at least two types of clearcoats to meet demands. One clearcoat, which is called a "spot and panel clearcoat" or "spot and panel clear", is mostly used to cover only small repair areas, typically less than 40 cm$^2$. This clearcoat generally does not have as good appearance as the second type but it dries very quickly. When only used in a small area, the appearance is not as critical. The second system, which is often called an "overall clearcoat" has a better appearance than does the spot and panel clear but it is slower to dry and therefore is less productive. This system is used for larger repair surfaces and therefore must have a good appearance.

To formulate current spot and panel clears, film-forming binders of moderate functionality are produced. The current invention uses the commercially available ChromaClear® HC-7600S, available from DuPont, Wilmington, Del. as the spot and panel clear. The 4:1 mix ratio and activator package associated with this clear was chosen as the basis for all other formulations i.e., primers, sealers, and overall clearcoat.

Current overall clears in general have a portion of the binder resins that have a lower MW than the spot and panel clears and also have higher functionality for improved flow and appearance. In this invention, an acrylic resin with 20-50% lower functionality and having higher molecular weight than used in a typical overall clearcoat, was used to reduce the isocyanate demand. This was combined with acrylic oligomer and structured polyester oligomer to provide better flow and appearance. While not meant to be limiting, useful acrylic oligomers are described in U.S. Pat. No. 6,559, 327. When used with a common activator and mix ratio described in this invention, this overall clearcoat formulation falls within the desired stoichiometric range as described above.

Single-Stage Topcoat

Single-stage topcoats consist of a pigmented film forming component, an activator, and an optional reducer. The film forming component, called the color, comprises a mixture pigmented tints and binder resins. Tints are made with opaque, transparent, or effect pigments and oligomeric and polymeric materials that provide dispersion and processing assistance. By combining tints, refinish body shops are able to match the color on the part being repaired or replaced. Topcoat properties, such as resistance to chipping, and appearance, such as gloss and DOI, are achieved through varying the binder resins. Different color formulas require varying amounts of binder resin. For example, colors that have an intrinsically poor hiding ability compensate by increasing the tint content in the color which in turn lowers the overall binder content. Because of the variable binder content, single-stage topcoats are formulated to cover a wider isocyanate-to-hydroxyl window compared to primer fillers, sealers, and clearcoats. The activator typically consists of polyisocyanates, catalysts, solvents, and other adjuvants and is used to crosslink the hydroxyl containing functionalities in the binder resin. In a 3K system, the reducer provides an additional means beyond the activator to adjust for environmental and workflow demands. ChromaOne, a typical single-stage topcoat sold by DuPont, has a color-activator-reducer mix ratio of 3:1:1.

In this invention, a binder component was designed to accommodate at color-activator mix ratio of 4:1. To accomplish this, an acrylic resin with a lower isocyanate demand through a 20-50% reduction in functionality is used. In order to maintain acceptable flow and appearance, an acrylic oligomer and a structured polyester oligomer, such as any of those listed above, are also incorporated into the binder. When used with a common activator and mix ratio described in this invention, the color family for the single stage topcoat formulation falls within the desired stoichiometric range described above.

Curing of the coating compositions applied by the present invention can be conducted under a variety of conditions known to those skilled in the art, although curing is preferably carried out under ambient temperature conditions, typically from about ambient to about 70° C. (60 to 160° F.).

EXAMPLES

The following examples show that the inventive paint system can be made using a 4:1 mixing ratio and that no reducer needs to be added.

All molecular weights were determined by gel permeation chromatography using polystyrene as an internal standard. Unless otherwise specified, all chemicals are available from the Aldrich Chemical Company, Milwaukee, Wis.

| Preparation of the common activator, (targeted for a 70-75° F. application window) | |
|---|---|
| Ingredients | Parts by Weight |
| Desmodur N 3300A[1] | 430.0 |
| Desmodur Z 4470 BA[1] | 53.9 |
| Butyl Acetate | 285.3 |
| Ethyl 3-Ethoxy Propionate | 98.3 |
| Xylene | 130.3 |
| Dibutyl Tin Dilaurate | 0.13 |
| P-toluene Sulfonyl Isocyanate | 2.0 |

Available from Bayer MaterialScience, Pittsburgh, Pa.

All of the ingredients were added in order to a metal can and mixed for 60 minutes using an impeller. During the mixing process, the mouth of the can was covered. The solution was transferred to airtight quart containers and sealed under a nitrogen atmosphere. The following properties were met for the common activator:

| | |
|---|---|
| Gallon Weight | 8.26-8.46 pounds/gallon |
| % Water | <0.05% wt |
| Weight Solids | 45.5-48.5% |
| % Isocyanate | 9.6-10.2% wt |
| Color | <50 APHA |

| Preparation of Acrylic Polymer #1 | | |
|---|---|---|
| | Ingredients | Parts by Weight |
| Part 1 | Xylene | 160.77 g |
| Part 2 | Styrene | 73.44 g |
| | 2-Hydroxyethyl methacrylate (HEMA) | 122.44 g |
| | Isobornyl methacrylate (IBOMA) | 73.44 g |
| | Methyl methacrylate (MMA) | 9.79 g |
| | 2-ethylhexyl methacrylate (EHMA) | 112.65 g |
| | Isobutyl methacrylate (IBMA) | 97.94 g |
| | Xylene | 13.70 |
| Part 3 | Xylene | 10.26 g |
| Part 4 | t-butyl peroxyacetate | 18.96 g |
| | Xylene | 45.66 g |
| Part 5 | Xylene | 5.71 g |
| Part 6 | t-butyl peroxyacetate | 3.29 g |
| | Methyl ethyl ketone | 41.24 g |
| Part 7 | Methyl ethyl ketone | 5.71 g |
| Part 8 | Xylene | 30.00 g |

Part 1 was charged to a reactor containing addition funnels, reflux condenser, thermometer, and a nitrogen inlet. The solvent was heated to a reflux, approximately 140-145° C. Part 2 was added to an addition funnel and stirred for 10 minutes. Parts 2 and 4 were added to the reaction mixture simultaneously over 180 minutes, keeping the reaction temperature at 140-145° C. When the addition of part 2 and 4 were completed, part 3 was used to flush the monomer feed and monomer feed lines. Part 5 was used to flush the initiator feed and initiator feed lines. The reaction was held at reflux temperature for 15 minutes. Part 6 was added via an addition funnel after the 15 minute hold time over a 30 minute time period, while maintaining the reflux temperature at 120-125° C. When the addition was complete, the reaction was held at reflux for 30 minutes. Part 7 was added to flush the initiator feed and initiator feed lines. The reaction was cooled filtered and filled out. Part 8 was added to flush the reactor.

The acrylic polymer had a solids content of 60% and a residual monomer content of MMA 0.02%, IBOMA 0.3%, IBMA 0.3%, HEMA 0.3%, EHMA 0.5%. The weight average molecular weight was 6500.

| Preparation of Dispersion Formula #1 | | |
|---|---|---|
| | Ingredients | Parts by Weight |
| Part 1 | Methyl isobutyl ketone | 13.9 |
| | Propylene glycol monomethyl ether acetate | 7.6 |
| | Methyl amyl ketone | 29.6 |
| | Xylene | 24.9 |
| | Aromatic 100[1] | 3.5 |
| | Acrylic Polymer #1 | 214.3 |
| | Anti Terra-U[2] | 1.8 |
| | Anti-settling dispersion[3] | 76.8 |
| Part 2 | Nicron 554[4] | 122.9 |
| | Hubercarb W3N[5] | 194.4 |
| Part 3 | Blanc Fixe[6] | 65.3 |
| | Ti-Pure R-960[7] | 63.7 |
| | Raven 410[8] | 2.1 |

[1]Aromatic 100 is available from ExxonMobile, Houston, TX
[2]Anti Terra-U is available from BYK Chemie, Wallingford, CT
[3]Dispersion of Anti Terra-U 3.75%, xylene 88.75%, and Bentone 34 7.5%. Bentone 34 is available from Elementis, Hightstown, NJ
[4]Nicron 554 is available from Luzenac Corp, Englewood, CO
[5]Hubercarb W3N is available J. M. Huber Corp, Atlanta, GA
[6]Blanc Fixe is available from Sachtleben Chemie GmbH, Duisburg, Germany
[7]T-Pure R-960 is available from DuPont, Wilmington, DE
[8]Raven 410 is available from Columbian Chemicals Company, Marietta, GA Using a stirrer with a DBI blade on low speed, part 1 was added in order and stirred for 30 minutes. After 30 minutes, the rate of stirring was increased to high and part 2 was added in order. This mixture was stirred for 15 minutes. Part 3 was then added slowly and was stirred for 60 minutes. The dispersion was then ground over 3 passes using 0.8 mm glass beads.

Preparation of Primer filler #1

| | Ingredients | Parts by Weight |
|---|---|---|
| Part 1 | Dispersion Formula #1 | 820.7 |
| Part 2 | Butyl Acetate | 11.7 |
| | Methyl Isobutyl ketone | 16.9 |
| | Ethyl acetate | 37.6 |
| | Propylene glycol monomethyl ether acetate | 11.4 |
| | Acrylic Polymer #1 | 17.1 |
| | Toluene | 3.3 |
| | Dibutyl tin diacetate[1] (10% in xylene) | 1.1 |
| | Octo-Soligen Zinc 8[2] | 6.0 |
| Part 3 | BYK-410[3] | 3.3 |

[1]Available from Air Products, Allentown, PA
[2]Available from Lanxess Corp., Akron OH
[3]Available from BYK Chemie, Wallingford, CT Dispersion Formula #1 was placed into a metal can. The dispersion was stirred with a propeller blade. The ingredients from Part 2 were added in order and the mixture was stirred for 30 minutes. Part 3 was added slowly and the mixture was stirred for 1 hour. The primer filler was allowed to sit for 2 hours before analysis.

Preparation of Ready to Spray Primer Filler Formulation 400 ml of primer filler #1 was combined with 100 ml of the common activator (prepared above). The solution had an initial Zahn #3 viscosity of 10.3 seconds. Three coats of the formulation were spray applied to a sanded steel substrate by an application specialist at 75° F. Flash time between coats was 9-12 minutes. Each coat had good application, perception of film build; i.e. thickness, and dry sanding (hand-sanding, dual-action sanding, and beardown sanding) with P400 paper with no loading or clogging of the sandpaper after 90-120 minutes drying time as determined by an application specialist. Measured film thickness was 5.1 mils.

Preparation of a Sealer Formulation

Preparation of acrylic polymer #2

| | Ingredients | Parts by Weight |
|---|---|---|
| Part 1 | Xylene | 229.12 |
| Part 2 | Styrene | 73.64 |
| | Methyl methacrylate | 93.19 |
| | Isobutyl methacrylate | 220.93 |
| | 2-Hydroxyethyl methacrylate | 98.19 |
| Part 3 | t-butyl peroxyacetate | 11.78 |
| | Xylene | 49.1 |
| Part 4 | Xylene | 2.95 |
| | Methyl ethyl ketone | 49.1 |

Part 1 was charged to a reactor and heated to reflux (138-142° C). The ingredients of part 2 were mixed and added to the reactor simultaneously with the premixed ingredients of part 3 over a three-hour period. When the addition of parts 2 and 3 was complete, part 4 was added and the reaction was held at reflux for 1 hour. The reaction was cooled and filled out. The acrylic polymer had a weight solids content of 59.6% and a weight average molecular weight of 10500.

Preparation of Polyester oligomer #1

| | Ingredients | Parts by Weight |
|---|---|---|
| Part 1 | Methyl Amyl Ketone | 168.02 |
| | Pentaerythritol | 114.25 |
| | Sanko HCA[1] | 3.58 |
| | Tetraethyl ammonium bromide | 2.64 |
| | Liquid Anhydride MHHPA 37[2] | 412.18 |
| Part 2 | 1,2-Butylene oxide | 202.33 |

[1]Sanko HCA is available from Sanko Chemicals Co Ltd, Osaka, Japan
[2]Available from Lonza Chemical, Basal, Switzerland The ingredients of part 1 were charged to reactor with stirring and were heated to 60° C. The temperature was allowed to level off after the resulting exotherm. The reaction mixture was then heated to 140° C. and held for 2 hours. The ingredients of part 2 were charged to the reaction over a 4-hour period. The reaction temperature was maintained at 140° C. until the acid number falls below 3.0 (approx. 6 hours). The reaction mixture was cooled and filled out.

The structured polyester oligomer had a weight solids content of 81.4% and a weight average molecular weight of 1069.

Preparation of Sealer dispersion #1

| | Ingredients | Parts by Weight |
|---|---|---|
| Part 1 | Butyl acetate | 155.11 |
| | Xylene | 63.02 |
| | Methyl amyl ketone | 92.33 |
| | Polyester oligomer #1 | 35.34 |
| | Acrylic polymer #2 | 227.98 |
| | GTP AB-Dispersant[1] | 6.62 |
| | BYK-320[2] | 2.62 |
| | Anti-Terra U[2] | 3.49 |
| | Dibutyl tin diacetate[3] | 1.32 |
| | Anti-settling dispersion[4] | 39.82 |
| Part 2 | Mistron Monomix[5] | 148.64 |
| | ZEEOS G200 Ceramic Microspheres[6] | 201.83 |
| Part 3 | Barium sulfate | 79.03 |
| | Ti-Pure R-960[7] | 100.78 |
| | Raven 410 powder[8] | 2.17 |
| Part 4 | Xylene | 63.02 |

[1]Prepared according to Example #1 US6316564.
[2]BYK-320 resin and Anti-Terra U are both available from BYK Chemie, Wallingford, CT.
[3]10% solution in xylene
[4]Dispersion of Anti Terra-U 3.75%, xylene 88.75%, and Bentone 34 7.5%. Bentone 34 is available from Elementis, Hightstown, NJ
[5]Mistron Monomix is available from Luzenac America, Englewood, CO
[6]ZEEOS G200 is available from 3M, St. Paul, MN
[7]Ti-Pure R-960 is available from DuPont, Wilmington, DE
[8]Raven 410 is available from Columbian Chemicals Company, Marietta, GA The ingredients of part 1 were weighed into a can and stirred with a DBI blade for 15 minutes. The ingredients of part 2 were slowly added then stirred for 30 minutes. The ingredients of part 3 were slowly added then stirred for 60 minutes.

The mixture was then dispersed in 3 passes using 2 mm glass beads.

Part 4 was added with mixing and was stirred for 30 minutes.

Preparation of a Ready to Spray Sealer Formulation 400 ml of sealer dispersion #1 was combined with 100 ml of the common activator (prepared above). The solution had an initial Zahn #2 viscosity of 16.8 seconds. One coat of the formulation was spray applied to a sanded OEM substrate at a booth temperature of 75° F. by an application specialist. The coating had commercially acceptable application, wet and dry texture, and a film build of 0.8 mils. The coating flashed in 8 minutes. Wet sanding with 1000 grit paper was excellent at 15 minutes after sealer application. The sealer was then top-coated with Chromabase basecoat and Chromaclear Clearcoat and baked for 30 minutes @ 140° F. The appearance was good with uniform texture (Long wave wavescan=4.9, Shortwave wavescan=37.9).

Preparation of a Ready to Spray Spot and Panel Clearcoat Formulation

A productive, air-dried clearcoat (HC-7600S™, available from DuPont, Wilmington, Del.) was activated by mixing with the common activator (prepared above) at a 4:1 clear-to-hardener volumetric ratio. The clearcoat was sprayed within 15 minutes of activation in a downdraft spraybooth at 74° F. and was applied on one side of newly basecoated front-end clip. Two coats of the activated clear were applied with a six minute dry time between coats, and the coating was air dried at 74° F. An expert sprayer performed application and evaluation of the clearcoat.

Each coat had commercially acceptable application characteristics and slightly skinny build perception. Coating thickness was 2.4 mills. The wet and dry appearance of the coatings were deemed acceptable. One hundred minutes after the second coat application, print recovery was found to be medium fast after creating a shallow mark, and the coating was considered to be ready for spot sand-and-buff repair.

Preparation of an Overall Clearcoat

| Preparation of polyester oligomer #2 | | | |
|---|---|---|---|
| | Ingredients | | Parts by Weight |
| Part 1 | Butyl acetate | | 62.92 |
| | Pentaerythritol | | 67.73 |
| | Milldride MHHPA[1] | | 244.46 |
| Part 2 | Glydexx Glycidylester N-10[2] | | 383.81 |
| | Dibutyl tin dilaurate | | 0.70 |
| | Butyl acetate | | 27.00 |
| Part 3 | Butyl acetate | | 84.08 |

[1]Available from Milliken Chemical Company, Spartanburg, SC
[2]Available from Resolution Performance Products, Hoogvliet, Netherlands Part 1 was charged to a reactor equipped with a stirrer, condenser, and a nitrogen blanket and was heated to 145° C. The reaction was held at 145° C. for 1 hour. Part 2 was fed to the reactor over a one-hour period while maintaining the reaction at 145° C. After part 2 was added, the reaction was heated to reflux, approximately 170° C., and was held at that temperature until the acid number was less than 1.0. When the acid number was less than 1.0, part 3 was added to the reactor and the mixture was heated at reflux for an additional 30 minutes. The reaction was cooled and filled out. The reaction mixture was 80.1% solids and had a Gardner-Holdt viscosity of W.

| Preparation of Acrylic Polymer #3 | | |
|---|---|---|
| | Ingredients | Parts by Weight |
| Part 1 | Xylene | 46.67 |
| Part 2 | Styrene | 15.00 |
| | Methyl methacrylate | 20.00 |
| | 2-Ethyl-hexylacrylate | 45.00 |
| | 2-Hydroxyethlyacrylate | 20.00 |
| Part 3 | Luperox 7M75[1] | 2.40 |
| | Xylene | 10.00 |
| Part 4 | Luperox 7M75[1] | 0.60 |
| | Methylethyl ketone | 10.00 |

Available from Arkema Inc., Philadelphia, PA

Available from Arkema Inc., Philadelphia, PA

Part 1 was charged to a reactor equipped with a stirrer, condenser, and a nitrogen inlet. The solvent was heated to reflux, approximately 140° C. Part 2 was mixed and added to the reaction over a 3-hour period. Part 3 was premixed and added to the reaction over a 3-hour period concurrently with a premixed part 2. When the additions of parts 2 and 3 were complete, part 4 was mixed and was added to the reactor over a 60-minute period. When the addition was complete, the reaction was held at reflux for an additional 60-minutes then cooled and filled out. The batch was tested to be 59.8% solids and have a Gardner-Holdt viscosity of V.

| Preparation of Acrylic copolymer #4 | | |
|---|---|---|
| | Ingredients | Parts by Weight |
| Part 1 | Methyl amyl ketone | 6.8 |
| Part 2 | Hydroxyethyl methacrylate | 22.2 |
| | Isobornyl acrylate | 37.8 |
| | Methyl amyl ketone | 1.6 |
| Part 3 | Methylamyl ketone | 20.4 |
| | t-butyl peroxy acetate | 1.8 |
| Part 4 | Methyl amyl ketone | 7.6 |
| | t-butyl peroxy acetate | 1.8 |

In a two reactor set, the first being operated at $1/10^{th}$ the volume of the second, and connected to the second via a transfer line, Part 1 was added and heated to 190° C. at 2.5 bar pressure. Part 2 followed by Part 3 were then charged to separate feed tanks, mixed and then fed to the first reactor over 280 minutes. Once the feeds increase the level in the first reactor to 90% of its normal operating volume, the reaction product from the first reactor was transferred to the second reactor so as to maintain a constant level in the first reactor. After 40 minutes of transfer from the first reactor to the second reactor, the second reactor was heated to reflux and Part 4 was fed to the second reactor over 270 minutes. Once Part 2 and 3 feeds were completed, the entire contents of the first reactor were dumped into the second reactor. The second reactor was held at reflux for 1 hour at 157° C., cooled and emptied. The resulting copolymer had GPC Mn of 1704, GPC Mw of 3380 and Mw/Mn of 1.98 with near complete conversion of the monomer. The average number of functionalities (hydroxyl) is 4.8 per polymer chain. The Tg of the copolymer was 57.3° C.

Preparation of an overall clearcoat formulation

| Ingredients | Parts by Weight |
|---|---|
| Acrylic polymer #3 | 6611.47 |
| Polyester oligomer #2 | 271.06 |
| Acrylic Copolymer #4 | 1841 |
| Tinuvin 384[1] | 69.1 |
| Tinuvin 292[1] | 65.78 |
| Methyl amyl ketone | 2412.41 |
| Acetone | 16.22 |
| Dibutyl Tin dilaurate | 46.8 |
| Ethyl-3-ethoxypropionate | 579.15 |
| BYK 306[2] | 41.46 |
| BYK 358[2] | 49.01 |
| Xylene | 222.23 |

[1]Available from Ciba Specialty Chemicals, Tarrytown, NY
[2]Available from BYK Chemie, Wallingford, CT.

The components of the clearcoat formulation were mixed. 500 ml of this solution was added to 125 ml of the common activator (prepared above). The solution had an initial Zahn 2 viscosity of 14:96 seconds. The compositions were sprayed by an applications expert in two coats over Chromabase® basecoat (light blue metallic) and were baked for 30 minutes at 140° F. in an Accudraft booth. The dry time after one coat was 8 minutes. The coating sprayed well and had good appearance. The thickness of the coating was 2.7 mils The preceding examples show that a refinish paint system can be formulated to use a common binder to activator mix ratio that has properties that are suitable for use in repairing a damaged vehicle.

The invention claimed is:

1. A refinish paint system comprising at least two paints;
wherein the first paint comprises a first unactivated film-forming portion comprising a first cross-linkable hydroxyl functionality and an activator comprising an isocyanate cross-linking functionality that when combined in a volumetric mix ratio forms a first coating composition having a stoichiometric ratio of isocyanate functionality to first hydroxyl functionality of about 0.9 to about 1.6; and
wherein the second paint comprises a second unactivated film-forming portion comprising a second cross-linkable hydroxyl functionality and the activator comprising the isocyanate cross-linking functionality that when combined in the volumetric mix ratio forms a second coating composition having a stoichiometric ratio of isocyanate functionality to second hydroxyl functionality of about 0.9 to about 1.6, wherein the first and second unactivated film-forming portions are different; and
wherein the first and the second paints comprise first and second different paint layers selected from the group consisting of a primer filler layer and a clearcoat layer.

2. The refinish paint system of claim 1 wherein; the first paint layer is a primer filler layer and the second paint layer is a clearcoat layer.

3. The refinish paint system of claim 1 wherein; the first paint layer is a clearcoat layer and the second paint layer is a primer filler layer.

4. The refinish paint system of claim 1 further comprising additional paints; wherein each additional paint comprises different unactivated film-forming portions and the activator that when combined in the volumetric mix ratio forms a different coating composition, and wherein each additional paint comprises different paint layers selected from the group consisting of a primer filler layer and a clearcoat layer.

5. The refinish paint system of claim 1, further comprising a third paint, wherein the third paint comprises a third unactivated film-forming portion comprising a third cross-linkable hydroxyl functionality and the activator comprising the isocyanate cross-linking functionality that when combined in the volumetric mix ratio forms a third coating composition having a stoichiometric ratio of isocyanate functionality to third hydroxyl functionality of about 0.9 to about 1.6, wherein the third unactivated film-forming portion is different from both the first and second unactivated film-forming portions, and wherein the third paint comprises a paint layer selected from the group consisting of: a primer sealer layer or a single-stage topcoat layer.

6. The refinish paint system of claim 5, further comprising a fourth paint, wherein the fourth paint comprises a fourth unactivated film-forming portion comprising a fourth cross-linkable hydroxyl functionality and the activator comprising the isocyanate cross-linking functionality that when combined in the volumetric mix ratio forms a fourth coating composition having a stoichiometric ratio of isocyanate functionality to fourth hydroxyl functionality of about 0.9 to about 1.6, wherein the fourth unactivated film-forming portion is different from all of the first, second, and third unactivated film-forming portions, and wherein the fourth paint comprises a paint layer selected from the group consisting of: a primer sealer layer or a single-stage topcoat layer, with the proviso that if the third paint comprises a primer sealer layer, then the fourth paint comprises a single-stage topcoat layer, and vice versa.

7. The refinish paint system of claim 1 wherein a separate solvent addition is required.

8. The refinish paint system of claim 1 wherein the unactivated film-forming portion to activator mix ratio is in the range between 8:1 to 1:1 for each of the layers.

9. The refinish paint system of claim 1 wherein the activator is selected based on ambient spray conditions of a refinish area where said paint system is applied.

10. The refinish paint system of claim 1, wherein the activator comprises at least a polyisocyanate and the first and second unactivated portions have has functional groups that react with said polyisocyanate.

11. A vehicle or any surface thereof painted with at least one layer of the refinish paint system of claim 1.

12. The refinish paint system of claim 1 wherein at least one of said two paints is a refinish clearcoat paint.

13. The refinish paint system of claim 1 wherein at least one of said two paints is a refinish primer filler.

14. The paint system of claim 1 wherein each layer is cured either at ambient temperature or at elevated temperatures up to 160° F.

* * * * *